(12) United States Patent
Nijhuis

(10) Patent No.: US 8,579,608 B2
(45) Date of Patent: Nov. 12, 2013

(54) FLUID ENERGY MACHINE

(75) Inventor: Theo Nijhuis, Weerselo (NL)

(73) Assignee: Siemens Aktiengesellschaft, München (DE)

( * ) Notice: Subject to any disclaimer, the term of this patent is extended or adjusted under 35 U.S.C. 154(b) by 399 days.

(21) Appl. No.: 12/989,984

(22) PCT Filed: Apr. 29, 2009

(86) PCT No.: PCT/EP2009/055168
§ 371 (c)(1),
(2), (4) Date: Oct. 28, 2010

(87) PCT Pub. No.: WO2009/133125
PCT Pub. Date: Nov. 5, 2009

(65) Prior Publication Data
US 2011/0044832 A1    Feb. 24, 2011

(30) Foreign Application Priority Data

Apr. 29, 2008  (DE) .......................... 10 2008 021 363
Jul. 7, 2008  (DE) .......................... 10 2008 031 994

(51) Int. Cl.
*F04D 29/05* (2006.01)
*F04D 29/056* (2006.01)
*F04D 29/058* (2006.01)
*F04D 29/059* (2006.01)

(52) U.S. Cl.
USPC .................................... 417/423.12; 417/244

(58) Field of Classification Search
USPC .................. 417/423.12, 244, 423.1; 310/90.5
See application file for complete search history.

(56) References Cited

U.S. PATENT DOCUMENTS

| | | | |
|---|---|---|---|
| 5,739,609 A | 4/1998 | Taniguchi et al. | |
| 5,857,348 A * | 1/1999 | Conry | 417/423.12 |
| 6,390,789 B1 * | 5/2002 | Grob et al. | 417/350 |
| 6,464,469 B1 * | 10/2002 | Grob et al. | 417/251 |
| 6,630,761 B1 * | 10/2003 | Gabrys | 310/90.5 |
| 6,982,510 B1 * | 1/2006 | Ajello et al. | 310/90 |
| 7,144,226 B2 * | 12/2006 | Pugnet et al. | 417/244 |
| 7,156,627 B2 * | 1/2007 | Lenderink et al. | 417/423.8 |
| 7,244,111 B2 * | 7/2007 | Suter et al. | 417/423.1 |
| 8,137,081 B2 * | 3/2012 | Gausmann et al. | 417/423.12 |
| 2007/0110601 A1 * | 5/2007 | Lenderink et al. | 417/423.12 |
| 2007/0201995 A1 * | 8/2007 | Harstad et al. | 417/423.12 |
| 2008/0129232 A1 * | 6/2008 | Matsubara et al. | 318/114 |
| 2008/0252162 A1 * | 10/2008 | Post | 310/90.5 |

FOREIGN PATENT DOCUMENTS

| | | |
|---|---|---|
| RU | 98119104 A | 5/1999 |
| RU | 2386048 C2 | 4/2010 |
| RU | 2394172 C1 | 7/2010 |
| WO | WO 2007067169 A1 | 6/2007 |
| WO | WO 2007110271 A1 | 10/2007 |

* cited by examiner

Primary Examiner — Peter J Bertheaud

(57) ABSTRACT

A fluid energy machine, in particular a compressor, is provided. The fluid energy machine includes a common rotor, which is mounted using magnetic bearings, for the flow machine and the drive. In addition to the magnetic bearings, auxiliary bearings are provided, wherein a friction bearing is provided on the bottom part of the vertically oriented rotor and a roller bearing, which provides both radial and also axial mounting, and is implemented as a ball bearing, is provided on the upper end.

16 Claims, 1 Drawing Sheet

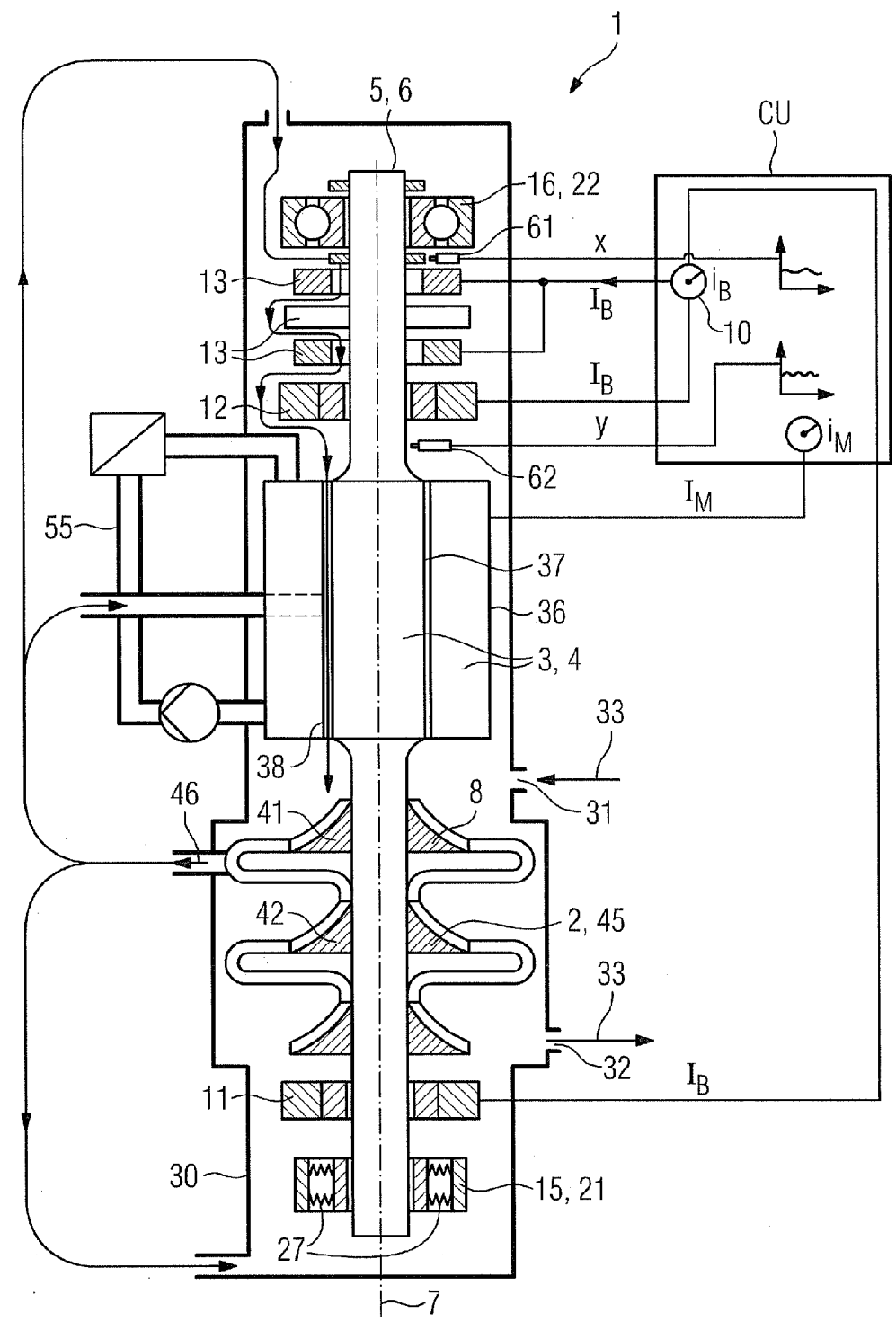

FLUID ENERGY MACHINE

CROSS REFERENCE TO RELATED APPLICATIONS

This application is the US National Stage of International Application No. PCT/EP2009/055168, filed Apr. 29, 2009 and claims the benefit thereof. The International Application claims the benefits of German applications No. 10 2008 021 363.2 DE filed Apr. 29, 2008 and 10 2008 031 994.5 DE filed Jul. 7, 2008. All of the applications are incorporated by reference herein in their entirety.

FIELD OF INVENTION

The invention relates to a fluid energy machine for increasing the pressure of a process fluid, in particular a pump or compressor, having a continuous-flow machine which increases the pressure of the process fluid, having a drive which drives the continuous flow machine, wherein the continuous flow machine has a rotor which is fitted with rotating flow guidance elements of the continuous flow machine, having at least one axial bearing which is in the form of a magnetic bearing and bears the rotor, having at least two radial bearings, a first radial bearing and a second radial bearing, which are in the form of magnetic bearings and bear the rotor, between which the continuous-flow machine is arranged.

BACKGROUND OF INVENTION

A fluid energy machine such as this is already known from PCT/EP2007/051393. One particular field of application for machines such as these is the compression of natural gas which is no longer fed by means of a platform for maritime resources but is compressed directly on the sea bed under the sea and is preferably passed by means of an appropriate pipeline to a land station. This application is particularly financially attractive, because conventional platforms can be omitted and, in a corresponding manner, their immense operating costs as well.

Complex development projects are currently searching for a solution for a compression unit which is matched to the severe conditions involved in compression under the sea. In addition to the difficulty of the chemically aggressive process fluid, which has not been purified and is subject to a continuously decreasing, fluctuating pressure, whereby this process fluid has to be compressed, this process fluid is in some cases liquid and in some cases gaseous, and access to the compressor unit is, of course, extremely difficult, as a result of which the unit preferably has to be designed to require no servicing or to be 100 percent available. In addition, the process medium is chemically aggressive, in the same way as the surrounding medium, and, for environmental protection reasons, there must be no exchange between the process medium and the surrounding medium, or between other working fluids and the surrounding medium.

One particular requirement is represented by the bearing for a rotor of a fluid energy machine such as this, which should preferably not require a working fluid, since any preparation or exchange with a land station would be too complex.

In addition, the rotor bearing must also comply with very stringent requirements for availability, fail safety and emergency running characteristics. With the rotor having a weight of several tons and a rotation speed of up to 20 000 revolutions per minute, a bearing such as this is subject to considerable requirements, as a result of which magnetic bearings are preferred at this point, both for the radial bearing and for the axial bearing. A further advantage of magnetic bearings is that they can be encapsulated, thus allowing the process fluid to flow around the units, as well. In addition, magnetic bearings do not require any working fluid, which could contaminate the surrounding medium or the process fluid.

SUMMARY OF INVENTION

Against the background of the described requirements and problems, the invention is based on the object of providing a fluid energy machine of the type mentioned initially, which is equipped with a bearing which, with only a small amount of servicing effort and with particularly high availability, provides reliable operation with a long life and excellent emergency running characteristics at the same time, even when highly dynamically loaded.

The object is achieved by a fluid energy machine of the type mentioned initially, which has the features stated in the claims.

The arrangement of auxiliary bearings according to the invention has the particular advantage that a robust journal bearing is chosen for the exclusively radial bearing and can be chosen to have a contact surface so as to produce only a very low load per unit area. With a radial bearing clearance of preferably $25/100$ mm to $3/10$ mm, the machine is sufficiently insensitive to dirt and sufficient space for the resultant oscillations during operation remains for the rotor at the location of the auxiliary bearing, or the auxiliary bearing is driven.

In addition to the radial forces which occur, the roller bearing can also absorb axial forces, thus resulting in a more compact machine for the more complex bearing task at this point. In this case, there is preferably a radial clearance between the internal diameter of the roller bearing and the rotor of about $25/100$ mm to $3/10$ mm. A total clearance of about $5/10$ mm to $6/10$ mm in the axial direction is expedient.

In order to non destructively absorb the bearing loads which occur, whilst making savings on any lubricant, it is also expedient for the roller bearing to be in the form of a ball bearing, such that the axial and radial bearing loads can be absorbed.

One preferred embodiment of the journal bearing provides that this journal bearing is manufactured from steel and, correspondingly and in particular, is not damaged by the exposure to the chemically aggressive media.

In order to ensure that the journal bearing is not damaged, for example because of severe oscillations, in the event of emergency stopping or tripping of the machine, it is expedient for the sliding surface of the journal bearing to be segmented, and for the individual segments to be mounted in a sprung form.

The drive for the fluid energy machine is preferably in the form of an electric motor, thus allowing, in particular, underwater operation. An electric motor such as this is preferably mounted on the same shaft as the continuous-flow machine and, together with it, forms a single rotor. An arrangement such as this is particularly compact.

Significant advantages result from a common rotation axis of the motor and of the continuous-flow machine being arranged vertically, thus making it possible to reduce to a minimum the bearing loads in particular of the radial bearings, since there is no longer any need to absorb the weight forces of the rotor.

This arrangement also has a positive effect on the dimensioning of the radial auxiliary bearings, which are not destroyed even in the event, for example, of a run-on from 12,000 revolutions per minute, but are able to withstand such a load repeatedly, without any lubricant.

The vertical arrangement has particular advantages when a radial bearing and the axial bearing are arranged in the upper end of the rotor, and a radial bearing is arranged at the lower end of the rotor and, at the same time, the auxiliary bearing which is in the form of a journal bearing is provided at the lower end of the rotor, and the auxiliary bearing which is in the form of a roller bearing is provided at the upper end of the rotor. The journal bearing which is located at the bottom is, of course, subject to a more severe dirt load than the roller bearing which is located at the top, with the journal bearing being more suitable for these severe operating conditions.

Furthermore, the auxiliary bearing is preferably arranged further outward on the rotor than the radial bearing which is in the form of a magnetic bearing, and the axial bearing. This is in particular because this results in better rotor dynamics, in particular better oscillation damping during normal operation. The bearing concept described so far is particularly advantageous when no additional radial bearing is provided between the motor and the continuous-flow machine and/or the motor and the continuous-flow machine are located between the two radial bearings. An alternative bearing is obtained if both the continuous flow machine and the motor each have two radial bearings themselves, and the rotor has a highly flexible area between the two radial bearings which are located between the continuous-flow machine and the motor, which highly flexible area essentially transmits the torsion torques (also referred to as a quill shaft).

For underwater operation in particular, although also for operation with toxic gases or in an explosion risk environment, a gas-tight common housing is expedient, which surrounds the bearing, a continuous flow machine and the motor.

One preferred embodiment of the invention provides that the fluid energy machine has a control unit which is connected to at least one axial and/or radial position and/or vibration measurement point on the rotor and/or to at least one current and/or voltage measurement point on at least one magnetic bearing, and is designed such that, when at least one measured value deviates by a specific extent from measured values during normal operation, the power supply to the motor is changed such that the motor brakes the rotor. The braking effect can be caused by eddy currents or by a magnetic field opposing the present rotation. This makes it possible to brake a rotor having a weight of several tons from a rotation speed of about 12,000 revolutions per minute to rest within less than 10 seconds. If the magnetic bearings fail or if particularly severe oscillations occur, this limits the amount of heat developed in the auxiliary bearings, which therefore remain very largely undamaged.

BRIEF DESCRIPTION OF THE DRAWINGS

The invention will be explained in more detail in the following text using one specific embodiment and with reference to a drawing, in which:

FIG. 1 shows a schematic illustration of a longitudinal section through a fluid energy machine according to the invention.

DETAILED DESCRIPTION OF INVENTION

The FIGURE shows a fluid energy machine 1 according to the invention with a continuous flow machine 2 and a drive 3, which is in the form of an electric motor 4. The drive 3 and the continuous-flow machine 2 have a common rotor 5 or a common shaft 6, which rotates about a vertical rotation axis 7. In the area of the continuous flow machine 2, the shaft 6 is fitted with flow guidance elements 8, which are in the form of impellers of a centrifugal compressor. A lower, first radial bearing 11 and an upper, second radial bearing 12, as well as an axial bearing 13 which is likewise arranged at the top, are provided in order to bear the shaft 6. The two radial bearings 11, 12 and the axial bearing 13 are encapsulated magnetic bearings.

If the magnetic bearings 11, 12, 13 fail, the rotor 5 is borne by means of auxiliary bearings 15, 16 which are each positioned on the shaft 6 in the area located further outward with respect to the magnetic bearings 11, 12, 13. A first auxiliary bearing 15 is provided for radial bearing, and a second auxiliary bearing 16 is provided for radial and axial bearing. In a corresponding manner, the bearing separation between the auxiliary bearings 15, 16 is greater than that between the magnetic bearings 11, 12, 13. The first auxiliary bearing 15, which is arranged at the bottom on the vertical shaft 6, is in the form of a journal bearing with a radial shaft clearance of about $25/100$ mm, as a result of which, during normal operation, the rotor 5 can rotate freely in the journal bearing without any contact. The second auxiliary bearing 16, which is located at the upper end of the vertical shaft 6 and is in the form of a roller bearing 22 or ball bearing, has the same bearing clearance. The roller bearing 22 has a clearance of $25/100$ mm radially. A total clearance of about $5/10$ mm to $6/10$ mm is provided axially.

The bearings 15, 16, 21, 11, 12, 13, 22 which bear the continuous-flow machine 2 and the drive 3 are located in a gas-tight housing 30 which has an inlet 31 and an outlet 32 for process fluid 33 to be compressed or which is compressed.

The magnetic bearings 11, 12, 13, the first auxiliary bearing 15 and a gap between the rotor 36 and the rotating element 37 of the electric motor 4 are cooled by means of the process fluid 33, which is taken from an overflow line 40 between a first stage 41 and a second stage 42 of the continuous-flow machine 2, which is in the faun of a compressor 45. The process fluid 33 is supplied from this bleed 46 to the bearings 15, 11, 12, 13 and the gap 38, where it then once again enters the first stage 41 of the compressor 45. The stator 36 also has its own cooling circuit 55.

Regulation for the control unit CU supplies the radial bearings 11, 12 and the axial bearing 13 with a respective operating current IB, and the drive 3 with an operating current IM. In addition, the axial shaft position X is detected by means of a sensor 61, and the oscillation level Y is detected by means of a sensor 62, and these are evaluated in the control unit CU. If the axial position X is subject to excessive deviation from the normal value or the oscillation level Y exceeds predetermined limit values, the machine is stopped (tripped). This also applies if at least one bearing current IB leads to the deduction that the bearing load is excessive. In the event of tripping, the control unit CU modulates the current to the motor IM such that the rotation of the rotor 5 is braked. This allows the rotor 5 to be brought to rest from a rotation speed of 12,000 revolutions per minute in about 10 seconds. If one or more magnetic bearings 11, 12, 13 fails or fail, the auxiliary bearings 15 provide the bearing for the rotor 5. Although the auxiliary bearings 15 have no lubrication and no separate supply of a lubricant, they can carry out the bearing task without damage during the short time involved in tripping.

The auxiliary bearing or journal bearing 21 which is arranged at the bottom has a radial bearing clearance of $25/100$ mm and is therefore particularly insensitive to dirt, thus ensuring operation despite the dirt particles which are deposited by the force of gravity in the lower machine area. The roller bearing 22, which is located at the top, combines the radial bearing with the axial bearing and, because it is arranged in the upper end of the shaft 6, is subject to less severe dirt.

The journal bearing 21 has sprung segments 27, which are designed to be flexible, such that an excessive bearing load does not lead to destruction of the steel running surfaces of the bearing.

The invention claimed is:

1. A fluid energy machine for increasing the pressure of a process fluid, comprising:
    a continuous-flow machine which increases the pressure of the process fluid;
    a drive which drives the continuous-flow machine;
    an axial bearing which is in the form of a magnetic bearing and bears the rotor;
    at least two radial bearings, a first radial bearing and a second radial bearing, which are in the form of magnetic bearings and bear the rotor, between which the continuous-flow machine is arranged;
    a first auxiliary bearing, which is in the form of a journal bearing, is provided on a first end of the continuous-flow machine where the first radial bearing is arranged; and
    a second auxiliary bearing which is in the form of a roller bearing is provided on a second end of the continuous-flow machine on which the second radial bearing is arranged, wherein the roller bearing is located on the second end of the continuous-flow machine on which the axial bearing is also arranged,
    wherein the continuous-flow machine includes a rotor which is fitted with a plurality of rotating flow guidance elements of the continuous-flow machine.

2. The fluid energy machine as claimed in claim 1, wherein the fluid energy machine is a pump or a compressor.

3. The fluid energy machine as claimed in claim 1, wherein the roller bearing is in the form of a ball bearing.

4. The fluid energy machine as claimed in claim 1, wherein the journal bearing includes a plurality of sliding surfaces comprising steel.

5. The fluid energy machine as claimed in claim 1, wherein no separate supply of a lubricating fluid is provided to the first auxiliary bearing or to the second auxiliary bearing.

6. The fluid energy machine as claimed in claim 3,
    wherein at least one sliding surface of the journal bearing is segmented, and
    wherein the plurality of segments are sprung.

7. The fluid energy machine as claimed in claim 1, wherein a clearance of between $1/10$ mm and $4/10$ mm is provided between the rotor and the auxiliary bearings, such that the auxiliary bearings do not rotate during normal operation.

8. The fluid energy machine as claimed in claim 1, wherein the drive is in the form of an electric motor.

9. The fluid energy machine as claimed in claim 8, wherein the electric motor is arranged on the same shaft as the continuous-flow machine.

10. The fluid energy machine as claimed in claim 1, wherein a rotation axis of the rotor is arranged vertically.

11. The fluid energy machine as claimed in claim 1, wherein the continuous flow machine and the drive are located between the first radial bearing and the second radial bearing.

12. The fluid energy machine as claimed in claim 8,
    wherein the first radial bearing is arranged with the journal bearing at the bottom of the rotor, and
    wherein the second radial bearing is arranged with the axial bearing and the roller bearing at the top of the rotor.

13. The fluid energy machine as claimed in claim 1, wherein the continuous flow machine, the drive, the axial bearing, the at least two radial bearings, and the first and second auxiliary bearings are arranged in a common gas-tight housing, which includes an inlet and an outlet for the process fluid.

14. The fluid energy machine as claimed in claim 1,
    further comprising a control unit which is connected to an axial and/or a radial position and/or a vibration measurement point on the rotor and/or to a current and/or a voltage measurement point on a magnetic bearing, and
    wherein when a measured value differs by a specific extent from a corresponding measured value during normal operation, a power supply to the drive is changed such that the drive brakes the rotor.

15. The fluid energy machine as claimed in claim 1, wherein the axial bearing, the at least two radial bearings, the first auxiliary bearing, and a gap between the rotor and a rotating element of the electric motor are cooled using the process fluid.

16. The fluid energy machine as claimed in claim 1, wherein a stator of the fluid energy machine includes a cooling circuit.

* * * * *